(12) United States Patent
Nee

(10) Patent No.: US 6,563,786 B1
(45) Date of Patent: May 13, 2003

(54) ORTHOGONAL FREQUENCY DIVISION MULTIPLEXING SYSTEM WITH SELECTABLE RATE

(75) Inventor: Richard Van Nee, De Meern (NL)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/224,695

(22) Filed: Jan. 4, 1999

(30) Foreign Application Priority Data

Jan. 6, 1998 (EP) .............................. 98200010

(51) Int. Cl.$^7$ ............................... H04J 11/00
(52) U.S. Cl. ....................... 370/208; 370/210
(58) Field of Search .................. 370/208, 206, 370/330, 343, 436, 203, 210, 212, 213, 224, 329, 336, 341, 345, 442, 458; 375/272, 355, 344, 346, 348, 468

(56) References Cited

U.S. PATENT DOCUMENTS

| | | | | |
|---|---|---|---|---|
| 5,963,592 A | * | 10/1999 | Kim ........................... | 375/232 |
| 6,018,528 A | * | 1/2000 | Gitlin et al. ................ | 370/436 |
| 6,038,275 A | * | 3/2000 | Taura et al. ................ | 375/371 |
| 6,088,327 A | * | 7/2000 | Muschallik et al. ........ | 370/210 |
| 6,091,702 A | * | 7/2000 | Saiki ........................... | 370/203 |

FOREIGN PATENT DOCUMENTS

EP 93307549.1 9/1993 ........... G06F/15/62

OTHER PUBLICATIONS

Larsson, et al "Mixed traffic in a multi carrier system" "1996 IEEE Vehicular Technology Conference, Apr. 28, 1996–May 1, 1996 New York, NY" pp. 1259–1263.

Rasmussen, et al "A Unifying discrete–Time Model For Direct Sequence and Multicarrier Variable Rate Broadband CDMA" "7$^{th}$ IEEE International Symposium On Personal, Indoor and Mobile Radio Communications, Oct. 15–18, 1996 New York, NY" pp. 1111–1115 vol. 3, XP002068805.

Okada, et al "Wideband indoor radio system using orthogonal multicarrier modulation" "IEEE International Conference On Systems Engineering" Sep. 17–19, 1992 New York, NY p. 457–462, XP002068806.

European Search Report dated Jul. 3, 1998.

R. VanNee, "OFDM Performance Comparison Submission Template," Doc: IEEE P802.11–98/73, Feb. 1998, pp. 1–2.

R. VanNee et al, "Summary of Merged Proposal," Doc: IEEE P802.11–98/72a, Mar. 1998, pp. 1–5.

R. VanNee et al, "Merged OFDM Physical Layer Specification for the 5 GHz Band," Doc: IEEE P802.11–98/72rl, Mar. 1998, pp. 1–27.

(List continued on next page.)

Primary Examiner—Douglas Olms
Assistant Examiner—Phirin Sam
(74) Attorney, Agent, or Firm—John Ligon

(57) ABSTRACT

An OFDM system uses a normal mode which has a symbol length T, a guard time TG and a set of N sub-carriers, which are orthogonal over the time T, and one or more fallback modes which have symbol lengths KT and guard times KTG where K is an integer greater than unity. The same set of N sub-carriers is used for the fallback modes as for the normal mode. Since the same set of sub-carriers is used, the overall bandwidth is substantially constant, so alias filtering does not need to be adaptive. The Fourier transform operations are the same as for the normal mode. Thus fallback modes are provided with little hardware cost. In the fallback modes the increased guard time provides better delay spread tolerance and the increased symbol length provides improved signal to noise performance, and thus increased range, at the cost of reduced data rate.

35 Claims, 2 Drawing Sheets

OTHER PUBLICATIONS

R. VanNee et al, "IEEE P8 02.11 Wireless LANs—Sharing Performance Evaluation for TGa PHY Submission," Doc: IEEE P802.11–98/71r 1, Mar. 1998, pp. 1–5.

R. VanNee, "OFDM Physical Layer Specification for the 5 GHz Band," Doc: IEEE P802.11–98/12, Jan. 1998, pp. 1–12.

R. VanNee, et al. "Scalable OFDM Radio Parameters," Doc: IEEE P802.11–97/92, Sep. 1997, pp. 1–12.

R. VanNee, "ODFM for High Speed Wireless Networks," Doc: IEEE P802.11–97/123, Nov. 1997, pp. 1–15.

* cited by examiner

ORTHOGONAL FREQUENCY DIVISION MULTIPLEXING SYSTEM WITH SELECTABLE RATE

CROSS-REFERENCE TO RELATED APPLICATION

This application claims priority of European Patent Application No. 98200010.1, which was filed on Jan. 6, 1998.

BACKGROUND OF INVENTION

1. Field of the Invention

This invention relates to communication systems and, more particularly, OFDM (Orthogonal Frequency Division Multiplexing) modulation schemes.

2. Description of Related Art

OFDM is a block-oriented modulation scheme that maps N data symbols into N orthogonal sub-carriers separated by a frequency interval of 1/T, where T is the symbol duration, i.e. the time period over which the sub-carriers are orthogonal. As such, multi-carrier transmission systems use OFDM modulation to send data bits in parallel over multiple sub-carriers (also called tones or bins). An important advantage of multi-carrier transmission is that inter-symbol interference due to signal dispersion (or delay spread) in the transmission channel can be reduced or even eliminated by inserting a guard time interval $T_G$ between the transmission of subsequent symbols, thus avoiding an equalizer as required in single carrier systems. This gives OFDM an important advantage over single carrier modulation schemes. The guard time allows delayed copies of each symbol, arriving at the receiver after the intended signal, to die out before the succeeding symbol is received. OFDM's attractiveness stems from its ability to overcome the adverse effects of multi-channel transmission without the need for equalization.

The transformations between blocks of symbols and baseband carrier signal are normally carried out using fast Fourier transform (FFT) techniques. A discussion of OFDM is given by Alard and Lasalle, EBU Technical Review, no. 224, August 1987, pages 168–190.

A need exists for a flexible OFDM system which provides the advantages of OFDM to a variety of communication environments.

In a previous patent application (U.S. Ser. No. 08/834,684, herein referred to as VN) I disclosed several techniques to scale data rates using OFDM. Scaling methods involve changing the clock rate, FFT size, coding rate, constellation size and guard time.

The present invention is intended to provide fallback rates with a minimum change in hardware.

SUMMARY OF THE INVENTION

The invention is an orthogonal frequency division multiplex communications apparatus employing a set of sub-carriers which are orthogonal over a time T, information-carrying symbols being expressed by superpositions of the sub-carriers, comprising the apparatus is configured to selectively operate in one of a plurality of signaling modes in each of which the duration of each the symbol is KT where K is a positive integer, different ones of the the modes having different values of K but the same set of sub-carriers.

In a preferred embodiment of the present invention, a first signaling mode (the 'normal' mode) uses a symbol length T, a guard time $T_G$ and a set of N sub-carriers and a second mode (the 'fallback' mode) uses a symbol length KT, a guard time $KT_G$ and the same set of N sub-carriers, where K is an integer greater than unity.

The technique can increase the range and delay spread tolerance without substantially changing the bandwidth and without changing the FFT size, at the cost of a decreased bit rate. Further, the fallback rates can also be used to provide a multiple access capability, so using fallback rates does not necessarily result in a bad spectral efficiency.

DETAILED DESCRIPTION

Figure 1:
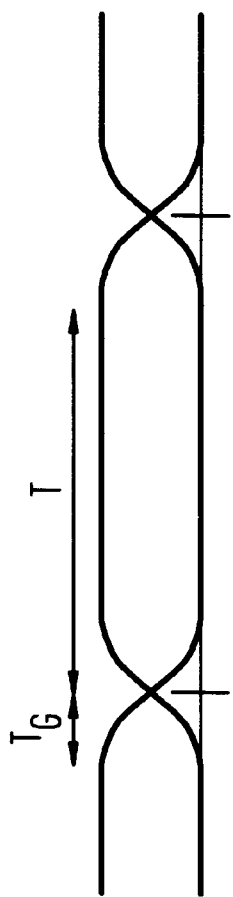
FIGS. 1 and 2 illustrate the transmission of an OFDM symbol in K=1 mode and K=2 mode according to the invention.

FIG. 1 shows an OFDM symbol transmitted with a symbol duration T and a guard time $T_G$. The object of the guard time $T_G$ is to accommodate any interference between consecutive symbols due to dispersion or multi-path interference (collectively referred to as 'delay spread'), and to leave a time T over which the symbol can be received free from such interference. Under some conditions, or in some applications, it may happen that the guard time $T_G$ is insufficient to accommodate this delay spread (as in FIG. 1). It may also happen that a greater range will be required, i.e. a higher signal-to-noise ratio in the recovered signal. Simply increasing the guard time $T_G$ would accommodate a larger delay spread, though it would not affect the range. Decreasing the clock rate seems a simple way of increasing the guard time $T_G$ and the symbol duration T, but it would also decrease the frequency spacing 1/T between the sub-carriers. This would proportionately decrease the overall bandwidth of the channel, which would mean that the filters that are required to remove aliases would have to be adaptable, thus increasing the hardware requirement.

Figure 2:
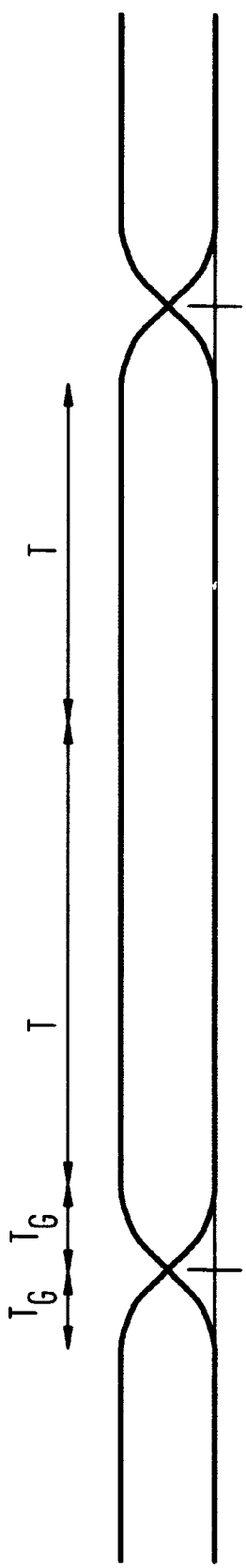

FIG. 2 shows a symbol which has been transmitted with twice the symbol duration 2T and with twice the guard time $2T_G$. The guard time is now doubled, and can accommodate the illustrated intersymbol interference. Also, since the symbol duration is doubled, the signal-to-noise performance, and hence the range, is improved. It is important to note that the frequencies of the sub-carriers are not also halved as would be the case with a simple halving of the clock rate. The same set of sub-carriers is used, still separated by 1/T, not ½T. Therefore, the overall bandwidth of the channel, which is mainly determined by the spread of subcarrier frequencies, and only to a much lesser extent by the widths of the individual sub-carriers, is substantially unchanged.

Since for any OFDM symbol, the signal repeats itself after T seconds, where T is the FFT interval, it is possible to do 2 FFTs on two different parts of the received symbol, each with a length of T seconds. Since both FFT outputs carry the same data, but different noise, they can be averaged to get a 3 dB increase in signal-to-noise ratio. The FFT is a linear operation, so it is also possible to first average two T seconds intervals and use this averaged signal as input to a single FFF. This scheme can easily be extended to other data rates; in general, any rate which is a factor K less than the highest bit rate can be produced by extending the symbol duration by a factor of K. By taking K FFTs per symbol, a processing gain of K is achieved which increases the range. At the same time, the delay spread tolerance is increased by a factor of K. The only extra hardware required is for averaging K consecutive signal intervals of T seconds. In fact, the amount of processing in terms of operations per second is decreased for fallback rates, because the averaging takes far less processing than the FFT. Consider, for instance, the case of an OFDM modem with a 64 point FFT and a symbol duration of 2 $\mu$s. A 64 point FFT involves about 192 complex multiplications and additions, so the processing load is 96 Mops, where an operation is defined as one complex multiply plus one addition. If the symbol duration is doubled to create a fallback rate, then in 4 $\mu$s, 64 additions have to be performed plus one 64 point FFT. Thus, the processing load becomes (192+64)/4 $\mu$s=64 Mops. In fact, this figure is pessimistic, because the extra additions have been given the same weight as multiplications, while they are significantly less complex when implemented in hardware. The additions are the only part of the receiver that has to run at the full clock rate; the FFT and everything following the FFT (channel estimation, decoding) can run at a rate that is K times lower than the original rate, which helps to reduce the power consumption.

Figure 3:
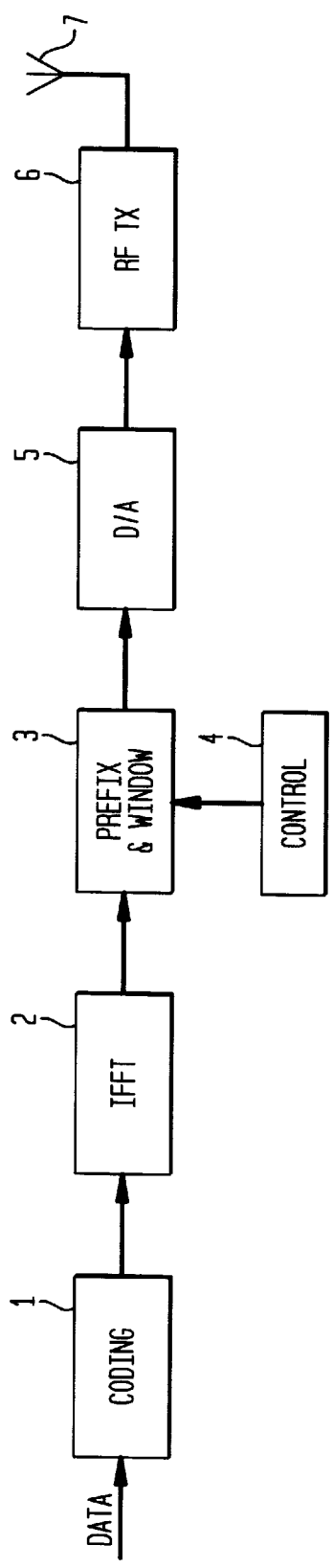
FIG. 3 shows, in block schematic form, a transmitter embodying the invention.

FIG. 3 shows an OFDM transmitter which receives a stream of data bits. A coding circuit 1 receives the data stream and partitions it into successive groups or blocks of bits. The coding circuit 1 introduces redundancy for forward error correction coding.

The blocks of coded data bits are input into an N-points complex IFFY (Inverse Fast Fourier Transform) circuit 2 where N is the number of the OFDM subcarrier. In this particular embodiment, using quaternary phase-shift keying (QPSK), the LFFT is performed on blocks of 2N coded data bits received from the coding circuit 1. In practice, the transmitter has to use oversampling to produce an output spectrum without aliasing which introduces unwanted frequency distortion due to (intended or unintentional) low pass filtering in subsequent stages of the transmitter or in the transmission channel. Thus, instead of an N-points IFFT an M-points IFFT is actually done where M>N to perform the oversampling. These 2N bits are converted into N complex numbers, and the remaining M-N input values are set to zero.

To decrease the sensitivity to inter-symbol interference, the cyclic prefixer and windowing block 3 copies the last part of the OFDM symbol and augments the OFDM symbol by prefixing it with the copied portion of the OFDM symbol. This is called cyclic prefixing. Control circuitry 4 controls the cyclic prefixer and windowing block 3 to switch the guard time and the symbol duration as required, or as appropriate, between their normal values $T_G$ and T respectively and their fallback values $KT_G$ and KT respectively. To provide the fallback values the cyclic prefixer has to augment the OFDM symbol with K−1 copies of itself, in addition to the prefix, which is preferably K times as long as the normal prefix.

To reduce spectral sidelobes, the cyclic prefixing and windowing block 3 performs windowing on the OFDM symbol by applying a gradual roll-off pattern to the amplitude of the OFDM symbol. The OFDM symbol is input into a digital-to-analogue converter after which it is sent to a transmitter front-end 6 that converts the baseband wave form to the appropriate RF carrier frequency in this particular embodiment for transmission from antenna 7.

Figure 4:
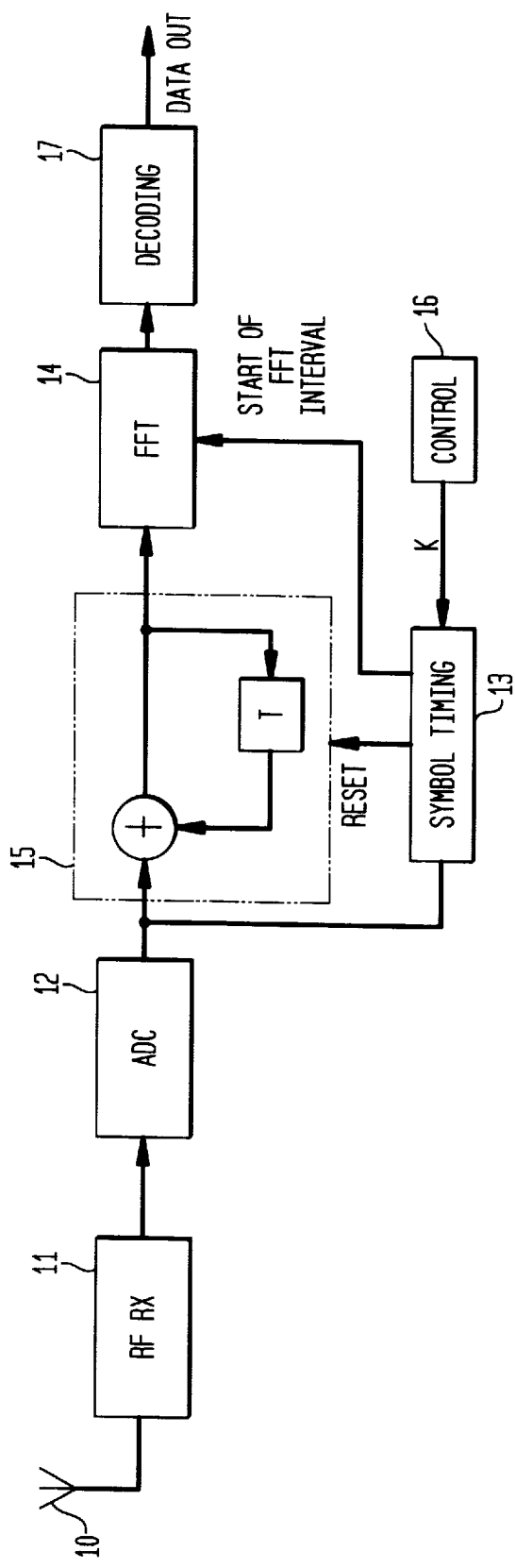
FIG. 4 shows, in block schematic form, a receiver embodying the invention.

With particular reference to FIG. 4, the transmitted OFDM signal is received by an OFDM receiver through an antenna 10. The OFDM signal is processed (down-converted) using the receive circuitry 11. The processed OFDM signal is input into an analog-to-digital converter 12. The digital OFDM signal is received by a symbol timing circuit 13 which acquires the OFDM symbol timing and provides a timing signal to a Fast Fourier Transform (FFT) block 14 and an integrate and dump filter 15. The integrate and dump filter 15 sums K samples that are separated by T seconds. The memory of the filter which consists of a delay line of M samples, where M is the FFT size—is cleared at the start of each new symbol. This reset time is indicated by the timing circuit 13 which is already present in a normal OFDM receiver to indicate the start of the FFT interval. A control circuit 16 sets the number of averaging intervals K.

As an alternative implementation, the integrate and dump filter could be placed after the FFT circuit 14 instead of before. In that case, for each symbol, K consecutive FFT outputs are averaged. However, the processing load is increased because the FFT always has to run at the maximum clock rate.

The sequence of symbols produced by the FFT circuit 14 is applied to conventional decoding circuitry 17 to produce the data output signal.

When a fallback rate is used at a rate that is K times lower than the original rate, the above described technique will produce subcarrier each of which has a bandwidth that is K times smaller than the original bandwidth. Thus, although the total signal bandwidth does not substantially change, the bandwidth of each subcarrier does become smaller. This makes it possible to do frequency division multiple access of up to K users in the same band. Each user has to shift its carrier frequency by a different multiple of 1/KT in order to stay orthogonal to the other users. As an example, when 64 subcarrier are used with a subcarrier spacing of 1 MHz, then it is possible to accommodate 4 users in the same channel when using a fallback rate with K=4. All 4 users use the same transmission and reception scheme as described above, but their carrier frequencies have an offset of 0, 250, 500 and 750 kHz, respectively, or, in general, n/KT, where the values of n are different MODULO K.

As discussed in VN, the control circuits 4, 16 may be responsive to external settings and/or the results of monitoring the signal quality. As also discussed in VN, it may be appropriate to use different modes for the up-links and the down-links in a communications system.

What is claimed is:

1. Orthogonal frequency division multiplex communications apparatus employing a set of sub-carriers which are orthogonal over a time T, information-carrying symbols being expressed by superpositions of said sub-carriers, comprising the apparatus is configured to selectively operate in one of a plurality of signaling modes in each of which the duration of each information-carrying symbol is KT where K is a positive integer, different ones of the plurality of signaling modes having different values of K but the same set of sub-carriers;

wherein a guard time is interposed between successive ones of said information-carrying symbols, the length of said guard time being greater for signaling modes with a greater value of K.

2. Apparatus as claimed in claim 1 wherein one of the said plurality of signaling modes has K=1.

3. Apparatus as claimed in claim 1 wherein the length of said guard time is $KT_G$ where $T_G$ is the same for all of the said signaling modes.

4. Apparatus as claimed in claim 1 being a receiver and including Fourier transform means (14) for recovering said information-carrying from said superposition of sub-carriers and averaging means (15) for providing, when operating in a signaling mode in which K>1, an average over K successive periods of duration T.

5. Apparatus as claimed in claim 4 wherein said averaging means (15) are connected upstream of the Fourier transform means (14) to receive the superposition of subcarriers of duration KT and derive an averaged superposition as input to the Fourier transform means (14).

6. Apparatus as claimed in claim 1 being a transmitter and including means (3,4) arranged to receive the superpositions of sub-carriers expressing the symbols and to derive a K-fold repetition of each said superposition.

7. A method of signaling using orthogonal frequency division multiplexing employing a set of sub-carriers which are orthogonal over a time T, information-carrying symbols being expressed by superpositions of said sub-carriers, comprising
  selecting one of a predetermined plurality of signaling modes in each of which the duration of each said information-carrying symbol is KT where K is a positive integer, different ones of the said modes having different values of K, but the same set of sub-carriers;
  wherein a guard time is interposed between successive ones of said information-carrying symbols, the length of said guard time being greater for signaling modes with a greater value of K.

8. A method as claimed in claim 7 wherein one of the said signaling modes has K=1.

9. A method as claimed in claim 7 wherein the length of said guard time is $KT_G$ where $T_G$ is the same for all of the said signaling modes.

10. Orthogonal frequency division multiplex communications apparatus employing a set of sub-carriers which are orthogonal over a time T, information-carrying symbols being expressed by superpositions of said sub-carriers, comprising:
  said apparatus being configured to selectively operate in one of a plurality of signaling modes in each of which the duration of each information-carrying symbol is KT where K is a positive integer, different ones of the plurality of signaling modes having different values of K but the same set of sub-carriers; and
  said apparatus including averaging means (15) for providing, when operating in a signaling mode in which K>1, an average over K successive periods of duration T.

11. An orthogonal frequency division multiplex transmitter employing N orthogonal sub-carriers, the transmitter comprising:
  a coding circuit that receives a stream of data bits and partitions the data stream into groups of bits, each group of bits forming a symbol;
  an inverse fourier transform circuit, operably coupled to the coding circuit, that performs an inverse fourier transform; and
  a prefix and window circuit, operably coupled to the inverse fourier transform circuit, that is configured to selectively operate in at least a first mode and a second mode, wherein the duration of an OFDM symbol in the first mode equals a symbol duration T plus a guard time $T_G$ and wherein the duration of an OFDM symbol in the second mode equals a symbol duration KT plus a guard time $KT_G$, where K is a positive integer greater than 1.

12. The transmitter according to claim 11, wherein the guard time $T_G$ is interposed between successive symbols.

13. The transmitter according to claim 12, wherein K=2 in the second mode such that the guard time in the second mode is twice the length of the guard time in the first mode.

14. The transmitter according to claim 11, wherein the coding circuit introduces forward error correction coding into the groups of bits.

15. The transmitter according to claim 14, wherein the transmitter includes a digital to analog converter operably coupled to the output of the prefix and window circuit.

16. The transmitter according to claim 15, wherein the transmitter included a transmitter front-end that converts a baseband waveform to an RF carrier frequency for transmission by an antenna.

17. The transmitter according to claim 15, wherein the transmitter includes control circuitry that controls the prefix and window circuit.

18. The transmitter according to claim 17, wherein the control circuitry is responsive to the results of monitoring signal quality.

19. The transmitter according to claim 14, wherein K=2 in the second mode such that the guard time in the second mode is twice the length of the guard time in the first mode.

20. The transmitter according to claim 11, wherein in the second mode the prefix and window circuit provides K−1 copies of the symbol of length T in order to form a symbol of length KT.

21. The transmitter according to claim 20, wherein the symbol is prefix with the K−1 copies of the symbol.

22. The transmitter according to claim 11, wherein the transmitter maps N symbols onto the N orthogonal sub-carriers.

23. The transmitter according to claim 22, wherein the inverse fourier transform circuit maps the N symbols onto the N orthogonal sub-carriers.

24. The transmitter according to claim 11, wherein K=2 in the second mode such that the guard time in the second mode is twice the length of the guard time in the first mode.

25. A method for signal transmission using orthogonal frequency division multiplexing employing N orthogonal sub-carriers, the method comprising the steps of:
  partitioning a stream of data bits comprising the signal into groups of bits, each group of bits forming a symbol;
  performing an inverse Fourier transform on each said symbol; and
  selectively operating a windowing function to switch between a first mode and at least one second mode, wherein the duration of an OFDM symbol in the first mode equals a symbol duration T plus a guard time $T_G$ and wherein the duration of an OFDM symbol in the second mode equals a symbol duration KT plus a guard time $KT_G$, where K is a positive integer greater than 1.

26. The method of claim 25, wherein the guard time $T_G$ is interposed between successive symbols.

27. The method of claim 25, wherein K=2 in the second mode such that the guard time in the second mode is twice the length of the guard time in the first mode.

28. The method of claim 25, wherein the partitioning step further includes an application of forward error correction coding for the groups of bits.

29. The method of claim 28, wherein K=2 in the second mode such that the guard time in the second mode is twice the length of the guard time in the first mode.

30. The method of claim 25, wherein a digital to analog conversion is applied at an output of the windowing function.

31. The method of claim 30, further including the step converting a baseband waveform to an RF carrier frequency for transmission by an antenna.

32. The method of claim 25, wherein in the second mode the windowing function provides K−1 copies of the symbol of length T in order to form a symbol of length KT.

33. The method of claim 32, wherein the symbol is prefixed with the K−1 copies of the symbol.

34. The method of claim 25, wherein N data symbols are mapped onto the N orthogonal sub-carriers.

35. The method of claim 34, wherein the inverse fourier transform circuit maps the N symbols onto the N orthogonal sub-carriers.

* * * * *